Figure 1:
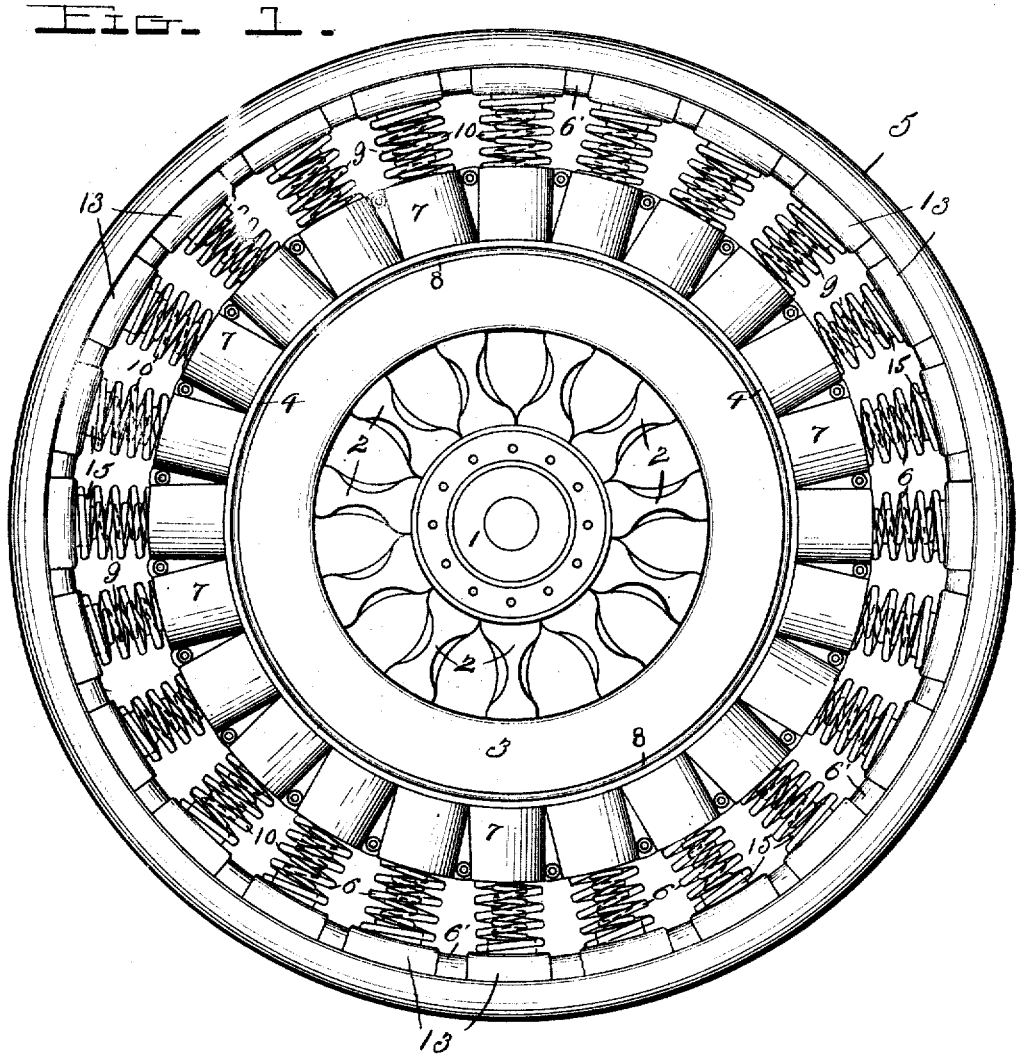

C. COUGHLIN.
SPRING WHEEL.
APPLICATION FILED JUNE 28, 1911.

1,025,080.

Patented Apr. 30, 1912.

2 SHEETS—SHEET 1.

Witnesses
C. C. Kemper.
V. B. Hillyard.

Inventor
Charles Coughlin.
By Victor J. Evans
Attorney

C. COUGHLIN.
SPRING WHEEL.
APPLICATION FILED JUNE 28, 1911.
1,025,080.
Patented Apr. 30, 1912.
2 SHEETS—SHEET 2.
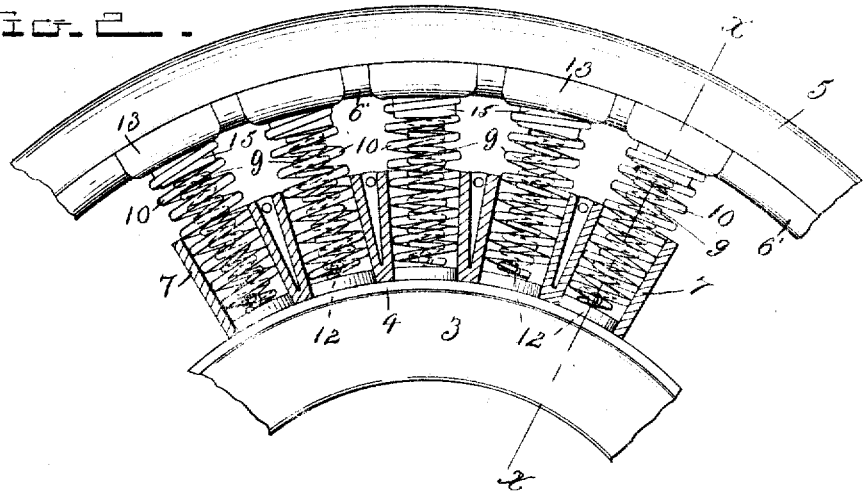
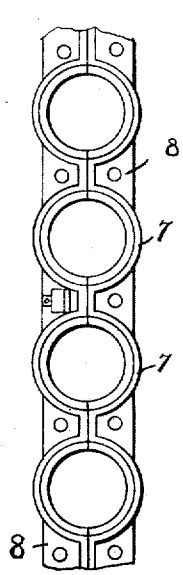
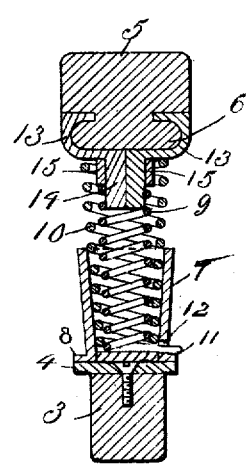
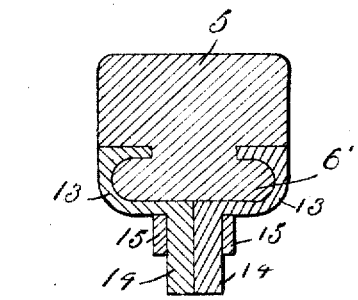
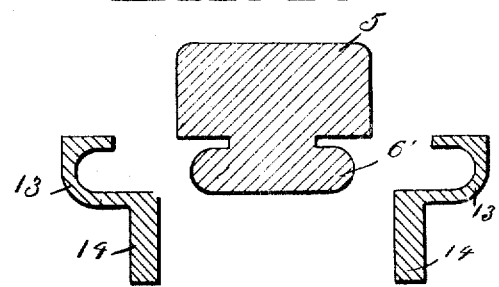
Witnesses
C. E. Kniper
U. B. Hillyard
Inventor
Charles Coughlin
By Victor J. Evans
Attorney

UNITED STATES PATENT OFFICE.

CHARLES COUGHLIN, OF JERSEY CITY, NEW JERSEY.

SPRING-WHEEL.

1,025,080.

Specification of Letters Patent.

Patented Apr. 30, 1912.

Application filed June 28, 1911. Serial No. 635,703.

*To all whom it may concern:*

Be it known that I, CHARLES COUGHLIN, a citizen of the United States, residing at Jersey City, in the county of Hudson and State of New Jersey, have invented new and useful Improvements in Spring-Wheels, of which the following is a specification.

This invention provides a wheel of the type having a yieldable tread and designed for automobiles, motorcycles and vehicles generally which are required to be equipped with wheels having soft treads to compensate for jar and vibration in order to secure comfort to the occupant of the vehicle and to prevent injury and excessive wear upon the running gear and other mechanism of the vehicle.

The invention relates to the class of wheels in which yieldable supports, such as springs, are interposed between the tread portion or tire of the wheel and an inner rim, the invention dealing more particularly with the mountings and connections whereby the springs or yieldable supports are secured to the respective parts.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a side view of a spring wheel embodying the invention. Fig. 2 is a sectional view of part of the rim portion of the wheel. Fig. 3 is an end view of the sockets attached to the inner rim and designed to receive the springs or yieldable supports. Fig. 4 is a transverse section on the line x—x of Fig. 2. Fig. 5 is a transverse section of the tire or tread portion of the wheel and the clamp and clamp collar. Fig. 6 is a transverse section of one of the clamps the parts being separated.

Corresponding and like parts are referred to in the following description, and indicated in all the views of the drawings, by the same reference characters.

The wheel comprises an inner portion and an outer portion. The inner portion of the wheel consists of a hub 1, spokes 2 and a felly or rim 3 to which is fitted a metal band 4. The outer portion of the wheel consists of the tire or tread 5, the yieldable supports 6 and the sockets 7, the latter being secured to the rim of the inner portion and receiving the inner ends of the yieldable supports. Each of the sockets 7 is formed of similar parts which are separable on a medial line corresponding with a plane passing through the wheel midway of opposite sides thereof. The sockets are formed in series and the sections are adapted to be bolted or otherwise secured by fastenings passing through openings formed in the meeting parts or webs between adjacent sections. The sockets have base portions 8 which fit against the metal band 4 and are riveted or otherwise fastened thereto. The sections of the sockets are arranged to break joint so as to secure a substantial structure. The open ends of the sockets face outwardly.

The yieldable or cushioning devices interposed between the tire 5 and the rim 3 are preferably helical springs, although any means may be resorted to for attaining the same end. Two springs 9 and 10 are had for each socket, the spring 9 being fitted within the spring 10 and the springs being reversely wound. The outer spring 10 has its base coil formed with an outer extension 11, which passes through an opening 12 formed in a side of the socket near the inner end thereof. This construction provides a positive connection between the spring and the socket. The springs are of the expansible type and when in position are under tension, their outer ends projecting a short distance beyond the outer ends of the sockets.

The tire or tread portion 5 may be of rubber, leather or other yieldable material and is formed upon opposite sides with beads 6'. Clamps are fitted to the tire 5 and have inwardly extending projections which enter the outer ends of the springs 9 and 10 so as to hold the parts in fixed position. Each of the clamps is formed of similar members, each of the members comprising a hook 13 and a shank 14, the hook 13 engaging over one of the beads 6'. When the members of the clamps are in position the shanks 14 come together and receive a collar or band 15, which is slipped thereon to prevent separation of the clamp members. The shank of each clamp projects inwardly a short distance from the collar 15 so as to enter the outer end of the spring 9, the latter bearing against the inner end of the collar 15 to hold it in place. The outer end of the spring 10 encircles the collar and bears against the base of the hooks 13.

By having the outer ends of the springs projecting beyond the sockets provision is had for play of the tire so as to compensate for jar and vibration. The construction is such as to admit of any of the springs being replaced should they lose their resiliency or otherwise become unfitted for effective service. The springs or cushioning devices having their inner ends fitted in the sockets and their outer ends fitted to the clamps in the manner set forth brace the tire laterally and sustain transverse strain and result in the formation of a substantial wheel.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

In a spring wheel a tire having side beads, clamps comprising similar parts, each part consisting of a hook and a shank, the hooks fitting about the beads of the tire and the shanks coming together, a collar slipped upon the shanks to hold the clamp members in position, an inner rim, sockets fitted to the inner rim, inner helical springs fitted in the sockets and having their outer ends encircling the inner ends of the shanks of the clamps and in contact with the collars, and outer springs fitted in the sockets and having their outer ends encircling the shanks and collars of the clamps.

In testimony whereof I affix my signature in presence of two witnesses.

CHARLES COUGHLIN.

Witnesses:
 HENRY B. STONE,
 CHAS. SEOSSBE.